(No Model.)
C. D. STANFORD.
COOLING ROOM FOR BREWERIES.
No. 472,936. Patented Apr. 12, 1892.
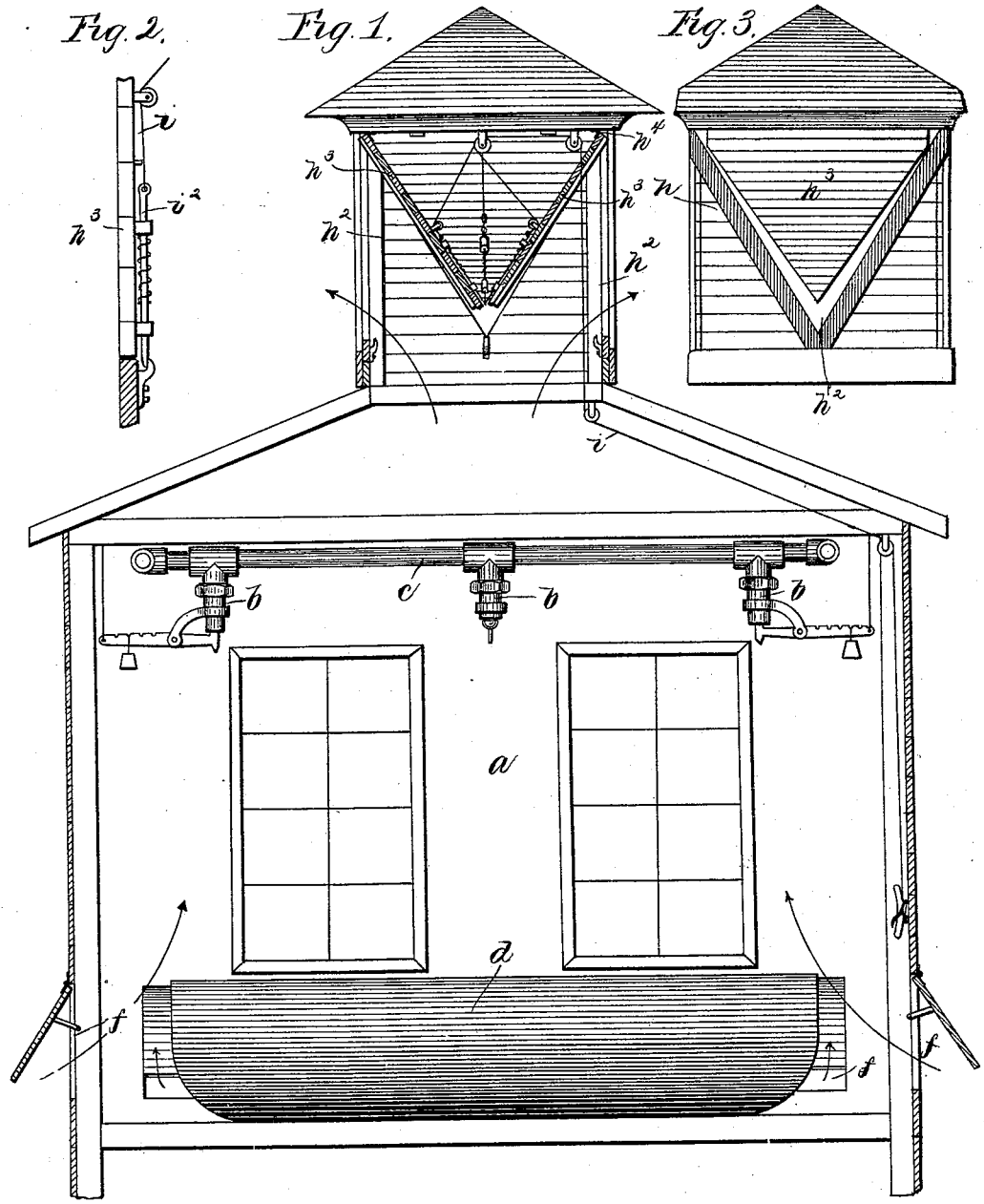
Witnesses
Jas. J. Maloney
M. E. Hill
Inventor
Charles D. Stanford
by Jos. P. Linmore
Att'y

UNITED STATES PATENT OFFICE.

CHARLES D. STANFORD, OF BOSTON, MASSACHUSETTS, ASSIGNOR TO THE HANFORD-STANFORD COMPANY, OF PORTLAND, MAINE.

COOLING-ROOM FOR BREWERIES.

SPECIFICATION forming part of Letters Patent No. 472,936, dated April 12, 1892.

Application filed February 26, 1891. Serial No. 382,855. (No model.)

*To all whom it may concern:*

Be it known that I, CHARLES D. STANFORD, of Boston, county of Suffolk, State of Massachusetts, have invented an Improvement in Cooling-Rooms for Breweries, of which the following description, in connection with the accompanying drawings, is a specification, like letters on the drawings representing like parts.

My invention relates to a cooling-room for use in breweries, in which the hot wort from the kettle is cooled and aerated by being delivered in the form of a spray in the upper part of the cooling-room and permitted to fall through the air onto a receiving surface or receptacle below, from which it is taken to the fermenting-vats. The cooling-rooms as now commonly constructed, where this process is employed, have their sides open to the external air during the spraying operation, the side walls being merely provided with slats arranged like those of a window-blind, so as to afford a partial protection to the interior of the room; but in all cases there has to be free admission of air during the spraying operation in order to make the latter effective. The side walls have heretofore generally been made open for practically their whole surface, the result of which is that air usually enters mainly from one quarter and passes transversely across and out at the opposite quarter of the room, producing mainly a transverse draft or current of air in the room. This is found to be objectionable; and the object of the present invention is to provide a construction by which the air will enter at the sides and substantially all around the cooling-room, flow inward and upward, and pass out at the top of the room, thus giving a far more efficient action upon the sprayed liquid and also obviating the tendency to blow the spray out from the room, which occurs in cooling-rooms of the kind heretofore constructed when there is a considerable natural movement of the air outside. This result is accomplished in accordance with this invention by making the side walls of the cooling-room tight for the greater portion of their extent, but providing them with openings in the lower part at or near the top of the collecting-receptacle, and also by providing the cooling-room at its top with an outlet-passage stack or ventilator through which the air may escape; and since in the process of treating the wort the latter gives out a large portion of heat the air in the chamber becomes rapidly heated, tends to rise and pass out through the stack at the top, and thus produce a natural draft by which the air is forced to enter with sufficient rapidity through the side inlet-passages. The stack or ventilator preferably employed is believed to be of novel construction, as will be hereinafter described.

Figure 1 is a transverse vertical section of a cooling-room for a brewery embodying this invention; Fig. 2, a detail showing one of the ventilator-covers and the fastening therefor in side elevation, and Fig. 3 a side elevation of the ventilator with its covers open.

The cooling-room $a$ is provided with spraying devices or atomizers $b$, from which the hot wort is delivered from the pipe $c$ into the cooling-room, so that it falls through the air and is received upon the collecting-receptacle $d$ in the lower part of the cooling-room. The said spraying devices or atomizers $b$ may be and are shown as of substantially the same construction as fully described in Letters Patent No. 435,000, granted to me on the 26th day of August, 1890, to which reference may be had, if desired, the present invention not relating to the specific construction of said atomizers, although the best results are attained by the employment of atomizers that throw from the sides toward the middle of the room, as described in that patent.

In order to produce proper effect in cooling and aerating the wort after it is delivered from the nozzles $b$, it is necessary that there should be a free circulation of air in the cooling-chamber $a$ and that air should enter from the outside freely in large quantities, so as to carry away the heat that is given off by the atomized liquid. This result has usually been effected heretofore by having substantially the entire sides of the cooling-room $a$ open to the external air, so that the latter can freely pass into and out from the cooling-room, usually making a draft across the room, which is objectionable, as it is likely to carry out the wort being sprayed; and the cooling-rooms are also frequently supplied with an overhead ventilator, by which air may pass in and out at the top of the room; but in such cases there has been more or less outward movement of the air at one or more sides of the room, causing a greater or less tendency to waste the sprayed liquid. In order to obviate this objection, the side walls of the cooling-room are, in accordance with this invention, made practically tight for the greater part of their extent, so as to exclude the external air, although they may be provided with windows in order to admit light, preferably of blue or amber glass, to decompose the white rays of the sun, which are found to deteriorate the wort; and in order to supply the requisite amount of air for acting upon the atomized wort the said walls are provided in their lower part only with inlet-openings *f*, preferably extending around the cooling-room just below the top of the collecting-receptacle *d*, so that the admission of cooling-air from the outside of the room is confined to the lower level in the room and is deflected upward upon entrance by the sides of the collecting-receptacles.

In order to insure circulation of the air in the chamber and a continuous lateral inflow of air during the cooling and aerating operation, the said chamber is provided with an outlet *h* in its upper part, (shown as a stack or chimney,) having outlet-openings $h^2$ to the external air.

As a very large quantity of heat is given off by the vaporized liquid the air in the chamber becomes quickly heated and thus tends to rise in accordance with natural laws and to flow out through the outlet *h*. The passage or stack *h* is preferably prismatic or rectangular in plan, as shown, and is provided with triangular apertures $h^2$, having their apexes downward, which apertures are provided with correspondingly-shaped covers $h^3$, hinged at the upper edge of the apertures, as shown at $h^4$, so that they can be swung inward from said apertures, in which case the several covers constitute an inverted prism having its apex downward in the draft-passage and tending to conduct the steam and heated air outward. The said covers may be set to close the apertures when required to protect the interior from the effects of the weather, and one or more of them may be wholly or partly closed while the others remain open. As shown in Fig. 1, the covers $h^3$ are shown operated by cords *i* passing over suitable pulleys and down into the cooling-room, so as to be accessible to the operator, who by pulling down the cord to a greater or less extent can open the covers to a greater or less amount, as required. The cords are shown as connected with sliding catches or bolts $i^2$ on the inner surface of the cover, so arranged that when the cover is permitted to drop by gravity the said bolts catch and fasten the same, and the operating-cords *i* are connected with the bolts in such manner that the pull on the cord first slides the corresponding bolt so as to release the cover, after which a further pull on the cord moves the cover inward to the extent desired.

By the herein-described means an upward circulation of air is maintained in the chamber during the operation of cooling and aerating the liquid by the lateral inflow through the side inlet-passages and the vertical outflow through the ventilator *h*, and there is substantially no draft across the room as was the case when the slats or openings extended to the top of the room, a construction which is objectionable in connection with the spraying process, as the air being violently blown across the room carries away more or less of the liquid spray suspended therein.

I claim—

1. A cooling-room for a brewery, containing spraying devices in its upper portion, a collector in its lower portion, surrounding tight walls, air-inlets in said walls arranged below the top of the collector, and an air-outlet at the top of the room provided with adjustable hinged covers for regulating the size of the openings in the outlet, substantially as described.

2. The combination, with a cooling-chamber having substantially air-tight walls provided with air-inlet openings in their lower portions, of a stack or air-outlet at the top of the chamber having triangular openings and covers for such openings hinged to swing inwardly and form an inverted prismatic body to deflect the ascending air outwardly, substantially as described.

In testimony whereof I have signed my name to this specification in the presence of two subscribing witnesses.

CHARLES D. STANFORD.

Witnesses:
JOS. P. LIVERMORE,
JAS. J. MALONEY.